(12) United States Patent
Edwards

(10) Patent No.: US 6,543,083 B1
(45) Date of Patent: Apr. 8, 2003

(54) BRISTLES HAVING VARYING STIFFNESS

(75) Inventor: Mark Stephen Edwards, Hockessin, DE (US)

(73) Assignee: E. I. du Pont de Nemours & Co., Wilmington, DE (US)

(*) Notice: Subject to any disclaimer, the term of this patent is extended or adjusted under 35 U.S.C. 154(b) by 0 days.

(21) Appl. No.: 09/575,817

(22) Filed: May 22, 2000

Related U.S. Application Data (63) Continuation-in-part of application No. 09/455,308, filed on Dec. 6, 1999, now Pat. No. 6,351,868, which is a continuation-in-part of application No. 09/092,092, filed on Jun. 5, 1998, now Pat. No. 6,096,151.

(51) Int. Cl.⁷ .............................. A46B 3/06; A46D 3/05
(52) U.S. Cl. ......................... 15/159.1; 15/205; 300/21
(58) Field of Search ..................... 15/159.1, 167.1, 15/195, 205; 300/21

(56) References Cited

U.S. PATENT DOCUMENTS

| | | | |
|---|---|---|---|
| 1,296,067 A | 3/1919 | Fuller | |
| 1,684,855 A | 12/1928 | Acheson | |
| 2,207,156 A | 7/1940 | Neville et al. | |
| 2,475,019 A * | 7/1949 | Faris ........................ | 156/173 |
| 2,599,191 A | 6/1952 | Meunier | |
| 2,786,508 A | 3/1957 | Waage | |
| 2,812,214 A | 11/1957 | Sandelin | |
| 2,980,467 A | 4/1961 | Lechene | |
| 3,107,124 A | 10/1963 | Barr | |
| 3,216,038 A | 11/1965 | Gould et al. | |
| 3,263,258 A | 8/1966 | Burge | |
| 3,618,154 A * | 11/1971 | Muhler et al. ............. | 15/167.1 |
| 3,726,751 A | 4/1973 | Casadevall | |
| 3,798,699 A * | 3/1974 | Lewis | |
| 4,030,845 A | 6/1977 | Deckert | |
| 4,148,953 A | 4/1979 | Horton | |

(List continued on next page.)

FOREIGN PATENT DOCUMENTS

| | | |
|---|---|---|
| DE | 2361482 | 6/1974 |
| DE | 2505198 * | 8/1975 |

(List continued on next page.)

OTHER PUBLICATIONS

PCT International Search Report, dated Mar. 2, 2001.
PCT International Search Report, dated Jan. 21, 2002.
U.S. patent application Ser. No. 09/092,094, Edwards et al., filed Jun. 1998.
U.S. patent application Ser. No. 09/247,093, Edwards et al., filed Feb. 1999.

Primary Examiner—Terrence R. Till
(74) Attorney, Agent, or Firm—Tamera L. Fair

(57) ABSTRACT

Bristle stiffness is varied by allowing a support beam that carries the bristles to undergo torsional movement in response to brushing action. Torsional movement is achieved by allowing the support beam to be disconnected to the brush head along at least portions of the length of the support beam. In particularly preferred embodiments, brushes employing the varying stiffness techniques are made with bristle sub-assemblies that have at least one row of bristles connected to a base string or similar structure that functions as a support beam. The base string can be connected across an opening in the brush, and is thus connected at its opposite ends, or it can be connected at any number of spaced intervals, the number and length of spacing being selected to achieve a desired degree of stiffness.

12 Claims, 4 Drawing Sheets

U.S. PATENT DOCUMENTS

| | | | |
|---|---|---|---|
| 4,211,217 A | | 7/1980 | Gueret |
| 4,325,900 A | * | 4/1982 | Holding et al. |
| 4,325,902 A | * | 4/1982 | Holding |
| 4,366,592 A | * | 1/1983 | Bromboz |
| 4,382,309 A | * | 5/1983 | Collis ................ 15/167.1 |
| 4,406,032 A | | 9/1983 | Diamant |
| 4,423,532 A | | 1/1984 | Yagi et al. |
| 4,438,541 A | | 3/1984 | Jacob et al. |
| 4,493,125 A | | 1/1985 | Collis |
| 4,507,361 A | | 3/1985 | Twilley et al. |
| 5,459,898 A | | 10/1995 | Bacolot |
| 5,470,629 A | | 11/1995 | Mokhtar et al. |
| 5,472,762 A | | 12/1995 | Edwards et al. |
| 5,498,459 A | | 3/1996 | Mokhtar et al. |
| 5,547,732 A | * | 8/1996 | Edwards et al. ......... 156/435 X |
| 5,682,911 A | | 11/1997 | Harada |
| 5,804,008 A | * | 9/1998 | Kennard et al. ......... 156/174 X |
| 5,967,617 A | * | 10/1999 | Zapanta |
| 6,041,463 A | * | 3/2000 | Stauch |
| 6,096,151 A | | 8/2000 | Edwards et al. |
| 6,260,229 B1 | * | 7/2001 | Edwards et al. |
| 6,269,514 B1 | * | 8/2001 | Edwards et al. |
| 6,351,868 B1 | * | 3/2002 | Edwards et al. |

FOREIGN PATENT DOCUMENTS

| | | |
|---|---|---|
| DE | 4114136 | 11/1992 |
| DE | 19536775 | 4/1997 |
| DE | 19604559 | 8/1997 |
| EP | 0596633 A1 | 5/1991 |
| FR | 2541-100 A | 8/1984 |
| GB | 384909 | 12/1932 |
| GB | 396730 | 8/1933 |
| GB | 1457074 | 12/1976 |
| JP | 1-236008 A | 9/1989 |
| JP | 6-154030 | 6/1994 |
| WO | WO 94/19521 | 9/1994 |
| WO | WO 96/06965 | 3/1996 |
| WO | WO 97/06003 | 2/1997 |
| WO | WO 97/14830 | 4/1997 |
| WO | WO 97/39651 | 10/1997 |
| WO | WO 98/25500 | 6/1998 |
| WO | WO 99/42019 | 8/1999 |
| WO | WO 99/62371 | 12/1999 |
| WO | WO 99/62711 A | 12/1999 |
| WO | WO 00/60980 A | 10/2000 |

* cited by examiner

BRISTLES HAVING VARYING STIFFNESS

This is a continuation-in-part of U.S. Ser. No. 09/455,308, by Mark S. Edwards, entitled "Bristle Sub-Assemblies Having Parallel Pairs Of Bristles; And Methods Of making Same," filed Dec. 6, 1999 now U.S. Pat. No. 6,351,868, which is a continuation-in-part of U.S. Ser. No. 09/092,092, by Mark S. Edwards et al., entitled "Method And Apparatus For Making Articles Having Bristles," filed Jun. 5, 1998 now U.S. Pat. No. 6,096,151.

RELATED APPLICATIONS

This case is related to co-pending application Ser. No. 09/092,094, by Mark S. Edwards, et al., entitled "Monofilament Bristle Assemblies And Methods Of Making Brushes Using Same," filed Jun. 5, 1998; and co-pending application Ser. No. 09/550,657, by Mark S. Edwards, et al., entitled "Method and Apparatus For Making Bristle Subassemblies, filed Apr. 17, 2000 (which was based on Provisional Application No. 60/130,883, filed Apr. 23, 1999.

BACKGROUND OF THE INVENTION

The present invention relates generally to brushes and the art of brush making, and more specifically, to a bristle sub-assembly in which bristles are connected at a base end to a supporting "beam," which could take the form of a base string, a bond line, or other structure which joins the common base ends of the bristles together in a row. A particularly useful application of such bristle sub-assemblies is in brush structures where segments of bristle sub-assemblies span open areas of a brush head or other supporting structures, and the flexibility of such bristles is at least in part determined by torsional characteristics of the beam.

DESCRIPTION OF THE RELATED ART

The aforementioned co-pending applications describe a method of making bristle sub-assemblies which involve wrapping a polymeric monofilament around a mandrel and bonding the individual wraps to one or more base strings by applying thermal energy. According to the aforementioned applications, an apparatus for making bristle sub-assemblies includes a rectangular-shaped mandrel around which is wrapped at least one continuous strand or monofilament. The strands or monofilaments form a plurality of "wraps" which are then placed in contact with at least one "base string," which runs generally orthogonally to the wraps. At the points of contact between the wraps and the base strings, ultrasonic energy is applied to cause the individual wraps and base strings to bond together. At a downstream processing point, cutters are used to turn the bonded base strings and wraps into bristle sub-assemblies.

Figure 1:
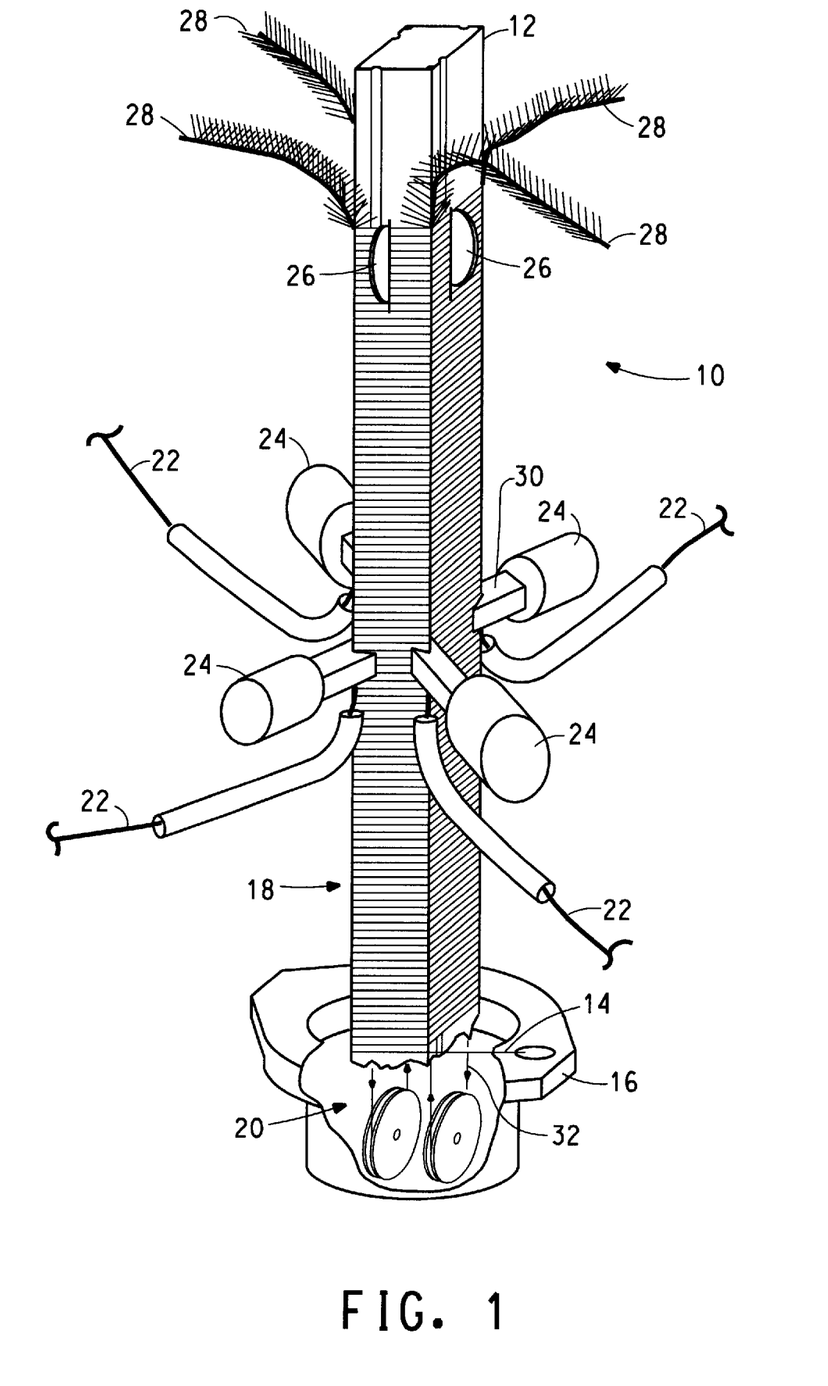
FIG. 1 is a schematic view of an apparatus for forming bristle strings.

One particularly preferred apparatus for making bristle sub-assemblies is shown in FIG. 1, wherein the apparatus 10 includes a rectangularly shaped mandrel 12, around which is wrapped a monofilament 14. A wrapping mechanism 16 rotates around the mandrel 12, laying out a plurality of "wraps" 18, which are moved vertically along the mandrel 12 by a conveyer mechanism, generally referred to by the numeral 20.

Four base strings 22 are fed into contact with the wraps from supply sources (not shown) near respective heating elements 24. When energy is supplied to the ultrasonic heating elements in contact with the base string, the surfaces of the monofilament wraps and/or the base strings, which are in contact with each other, become plastic; after cooling, which occurs immediately after the wraps move away from the heating elements, the wraps of monofilament and the base strings become bonded together.

As the bonded wraps and base strings move further away from the heating elements, they pass through cutters 26, only two of four being seen from the view of FIG. 1. The cutters 26 slit the bonded wraps into four bristle strings 28, each of which can be taken up on reels (not shown) or other means for further processing.

Figure 2:
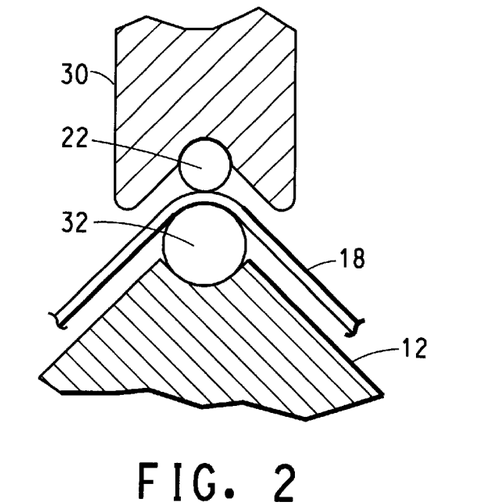
FIG. 2 is an enlarged, cross-sectional view showing the point of contact between a monofilament wrap and a base string, in the apparatus of FIG. 1, and approximately at the ultrasonic heating station.

FIG. 2 is an enlarged view showing the point of contact of one of the monofilament wraps 18 and one of the base strings 22. The base string is held by a horn 30 of the ultrasonic heating element, while a cable 32 of the conveyor mechanism 20 translates the monofilament wraps up the mandrel 12. The cable 32 and base string move in the same direction at the same speed, so that the bonded wraps and base string are moved to the cutters 26 and spit into separate bristle strings 28.

Figure 3:
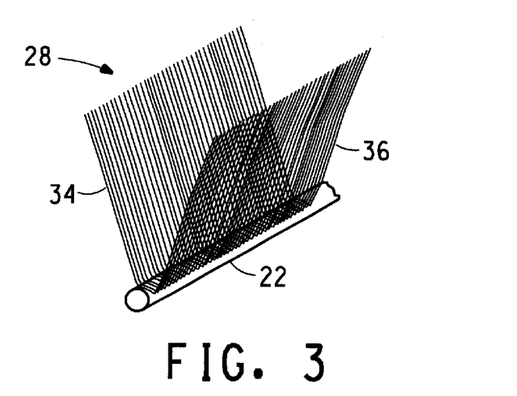
FIG. 3 is an elevational view of a bristle string which includes first and second rows of bristles connected to a base string.

One of the bristle strings 28 is shown in FIG. 3, as having a base string 22, and two rows 34 and 36 of bristles which are made of the monofilament that had previously been used to form the wraps. The bristle rows have a tendency to form a V-shape, with the base string at the vertex of the "V." Further processing steps can be used to render the rows of bristles parallel to each other; alternative orientations can also be made when desired.

The details of how the bristle strings are formed, and how they can be combined with brush bodies to form a variety of brushes, are described in the aforementioned co-pending and related applications, which are incorporated herein by reference. In making brushes using the bristle strings described herein and in the related and co-pending applications, the bristle strings are cut into lengths that can be called "bristle sub-assemblies." These lengths can be embedded in or otherwise attached to the brush bodies to form a wide variety of sizes, shapes and types of brushes.

While the bristle sub-assemblies described above have many advantages, a continuing need exists for improved brushes and bristles employed in same, as well as for methods and means for varying or otherwise controlling the stiffness of the bristles without necessarily changing the physical parameters of the bristles themselves.

SUMMARY OF THE INVENTION

An object of the present invention is to provide a bristle sub-assembly in which the stiffness of the bristles can be varied by changing one or more parameters of the beam structure that supports the bristles.

Another object of the invention is to provide a method of varying the stiffness of the bristles of a brush by changing one or more parameters of the beam structure used to support the bristles of the brush.

Still another object of the present invention is to provide a method of changing the stiffness of a bristle without changing the material or diameter of the bristles themselves.

These and other objects are met by providing a brush which includes a brush body, at least one bristle sub-assembly having a support beam having first and second opposite ends and a row of bristles having proximal and distal ends, at least one point of attachment between the brush body and the support beam, thereby defining at least a portion of the bristle sub-assembly that extends into free space, and means for varying the stiffness of the bristles of the bristle sub-assembly.

Preferably the means for varying the stiffness of the bristles is a physical parameter of the beam, such as cross-sectional shape, material properties Young's Modulus, and thickness. Additional means for varying the stiffness include coating at least a lower portion of the bristles with a polymeric, preferably elastomeric, material, and altering the cross-section of the bristles, such as by tapering the end portions.

These and other objects and features of the invention will be better understood in referencing the following detailed description and drawings.

DETAILED DESCRIPTION OF THE PREFERRED EMBODIMENTS

Figures 4, 5, 6:
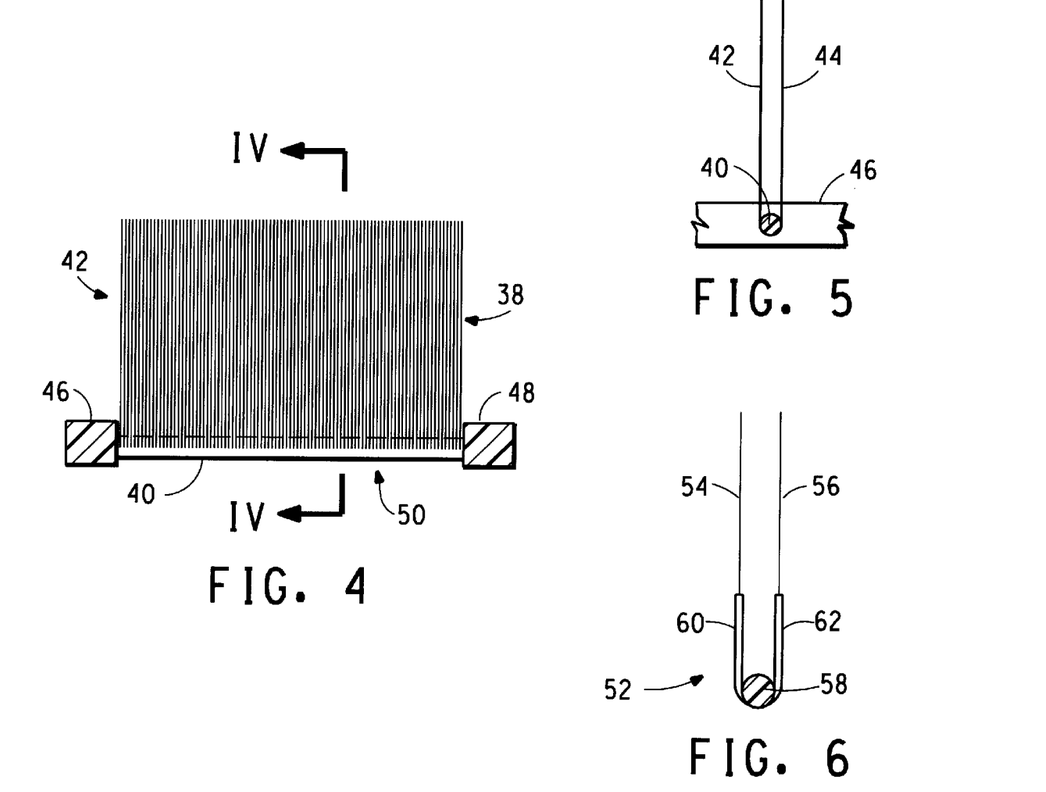
FIG. 4 is a vertical, longitudinal sectional view, showing a bristle sub-assembly spanning between two points on a brush head across an opening or open space.
FIG. 5 is a vertical, transverse sectional view, taken along line IV—IV of FIG. 4.
FIG. 6 is an end view of a bristle sub-assembly in which the lower, or proximal, end portions of the bristles are coated with an elastomeric material to provide additional stiffness.

Referring to FIGS. 4 and 5, a bristle sub-assembly 38 has a base string 40 and two rows 42 and 44 of bristles. The bristle sub-assembly 38 is anchored to two fixed structures 46 and 48, between which is an open space 50. The fixed structures 46 and 48 can be different parts of the same brush head, for example, where the head defines an opening and the bristle sub-assembly 38 spans the opening. For purposes of the present invention, the bristle sub-assembly 38 has any length which is unbounded, or freely spanning between opposite ends that are connected or fixed to a relatively non-movable structure, or semi-rigid structure.

In the past, stiffness of bristles have been controlled to some extent by varying certain parameters of the bristles, such as their length or height, cross-sectional shape, thickness, and the type of material used. The use of the bristle sub-assemblies made according to the aforementioned co-pending applications has led to the creation of relatively high aspect ratio bristle arrays, meaning long, thin rows of bristles. These bristle sub-assemblies have the added advantage of being cost effective to produce.

One aspect of the present invention is the realization that, if an individual bristle sub-assembly is suspended in free space, by attachment at its opposite ends to different points on a brush body, another mechanism for controlling stiffness arises: torsional movement and flexion of the base structure of the bristle sub-assembly that imparts changes in the apparent stiffness of the bristles. In other words, the bristles will rotate about the axis of the base string, or other supporting "beam" structure, to thereby feel softer to the touch. Thus, thicker diameter bristles, for example, can be made to feel softer—or as soft as a thinner bristle monofilament—by changing the properties of the base string. Those properties include Young's modulus of the material from which the base string or other beam material is made; the diameter of the base string; the geometry or cross-sectional shape of the base string; the length of the base string extending between the two attachment points; and the tension imparted in the base string.

Additional bristle action or movement can be achieved when segments of the base of a bristle sub-assembly are allowed to span between attached points. The length of the span can be determined by the type of brush envisioned, such as a toothbrush as opposed to a vacuum brush, the overall size, and the degree of movement desired. For a given material, base string geometry and diameter, bristle diameter and bristle height, all held constant within a bristle sub-assembly, the softness of the bristles will vary according to position along the non-attached segment of the bristle sub-assembly, with the first and last bristles having the highest stiffness and the center bristles being the most soft.

The continuous change in sensible stiffness for a constant force applied along the suspended length is produced by the differential displacement of each bristle tip according to the cumulative contributions generated from the bending of the bristle, the degree of rotation of the base string (torsional motion) at the base of the bristle, the bending or flexion of the base string at the bristle base, and the selection of material properties for the base string. Bristles within a bristle sub-assembly, located at or juxtaposed the anchoring point to the brush head have limited motion, primarily bending motion and are similar to bristles tufted into a tuft hole of a conventional brush. While the bristles located near the anchor point exhibit movement similar to that of a conventional brush, bristles more distant to the anchor point exhibit an increasingly lower stiffness value (higher movement) due to the contribution of the base string component.

The base string described above can be a separate strand of material, as in the preferred embodiments of the prior co-pending applications, or other "beams" can be formed by the fused area of bristles not connected to a base string, such as when bristles are laid side by side and fused together at the base. The fused area becomes the beam or base string. A glue line or extrusion line could also be used to form the beam.

By mixing and matching the parameters described above, one can achieve virtually any desired degree of bristle stiffness. The bristle sub-assembly product can be customized to a stiffness range by combining physical dimensions, and whether they are solid or have voids. The span distance between anchor points and to some degree the tension will also contribute to customizing the range of movement.

The bristles in a linear bristle sub-assembly, such as those described in the co-pending applications, are freer to move than bristles densely packed in a conventional tuft hole. Conventional tufting techniques pack tens of bristles into a single hole. The hole can be of many shapes but what is common to all is a low aspect ratio with a circular hole having an aspect ratio of 1.0 and oval or rectangular holes having aspect ratios of up to 10. When packed into these holes, most bristles are in contact with and thus have friction with neighboring bristles on many or all sides. This increases bristle stiffness of a given diameter bristle through the support provided by these neighboring bristles and effectively shortens the length which is free to move. By comparison, a bristle sub-assembly according to those described herein have relatively large aspect ratios. Therefore, an individual bristle has fewer neighboring bristles to interact with and be supported by, and thus, is less stiff.

Figure 7:
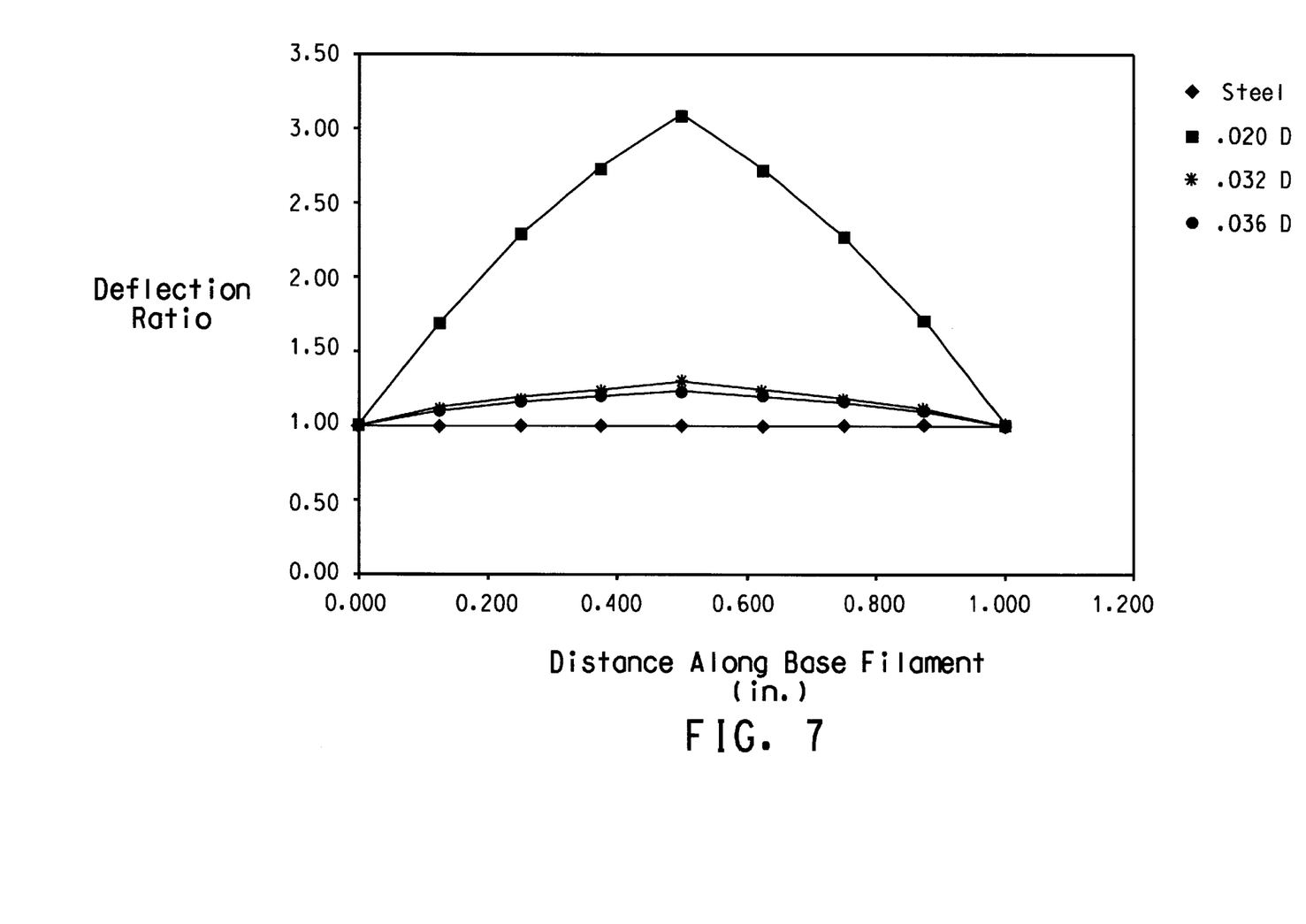
FIG. 7 is a chart showing modeling of base string deflection ratio as a function of thickness, or diameter, of the base string.

Referring to FIG. 7, modeling of Nylon brush filaments was performed and the results are presented. A Nylon bristle diameter of 0.006 inch was used as a constant, while the base string was varied, using steel as the base for comparison to a torsionally "stiff" material. On the horizontal axis, the distance along the base filament is shown in inches. Attachment is assumed over a one inch span, with peak deflections shown at the mid-point between the span. The steel base string is shown to have no deflection, due to its inherent properties and the force applied. However, the degree of deflection increases with thinner diameter, lower modulus, polymeric base strings. In conclusion, it can be seen that bristle deflection varies from end bristle to center bristle, and that the base filaments deflect only slightly. Moreover, deflection is the sum of bristle cantilever bending plus base filament rotation, and base filament diameter has a large influence on bristle deflection.

The use of a spanning bristle sub-assembly, or for connecting a bristle sub-assembly at different points while leaving portions unconnected, has numerous possible uses in different brush types. For example, in a vacuum attachment, an open brush head attachment would allow the air to flow up through the bristle structure and keep air flow resistance to a minimum since the bristles do not need to be continuously embedded in a support structure. In this case, high torsional stiffness may be preferred for general cleaning so there is little torsional deflection across the length of bristles.

In some abrasive brush applications, the use of the side of the bristle is preferred over the tip of the bristle. When relatively large bristles are used they do not bend easily and therefore are limited more to the tip. By attaching them to a supporting base structure which torsionally twists under load, the bristles would then tend to lay away from the direction of rotation and expose more of the bristles side, thus increasing the contact area between the work and the bristles (thereby gaining efficiency).

In cleaning brushes, brushes used in applications such as on the end of a garden hose for car washing should be soft while allowing the fluid (cleaning solution or rinse) to work together with the bristles. A preferred attachment would allow the solution to be discharged at the base of the bristles. This serves to not only continuously wet the bristles but to cleanse the bristles from entrapping harmful dirt particles. Soft bristles are required to prevent damage to the car finish. The sides of a bristle will do less abrasion to the finish than the pointed ends of a bristle. Therefore more rigid (aggressive) bristles could be used if they torsionally deflect to expose the bristle side rather than the tip.

In other brush designs, a bristle sub-assembly which has a sufficiently stiff base structure may not need a supporting head or wire as is typically understood in the art. The base structure of the sub-assembly could be directly attached to a handle such as in a mascara brush or bottle brush. With the proper cross-section of the base structure to which the bristles are attached, the base may be relatively stiff to bending, yet torsionally soft. This would allow the bristles to be stiff using an axial movement and soft using a rotational movement.

In general, the bristle sub-assemblies need not be connected at the ends of the base string, as would be the case where a bristle sub-assembly is suspended across an opening in a brush head or other supporting structure. For example, in FIG. 8, a bristle sub-assembly 64 includes a base string 66 and a row of bristles 68. In this case, the bristle sub-assembly is connected to an upper surface of a brush head 70 at spaced intervals, such as by spot welds 72, 74 and 76. Consistent with the teachings above, the bristles nearest the spot welds will have the greatest apparent stiffness, due to the spot welds' limiting effect on the amount of torsional movement of the base string 66. However, the amount of limitation provided by the spot welds can be controlled by controlling the amount of surface area of the base string that is covered by weld material. A complete covering of the base string with weld material will have a maximum limiting effect.

Figure 8:
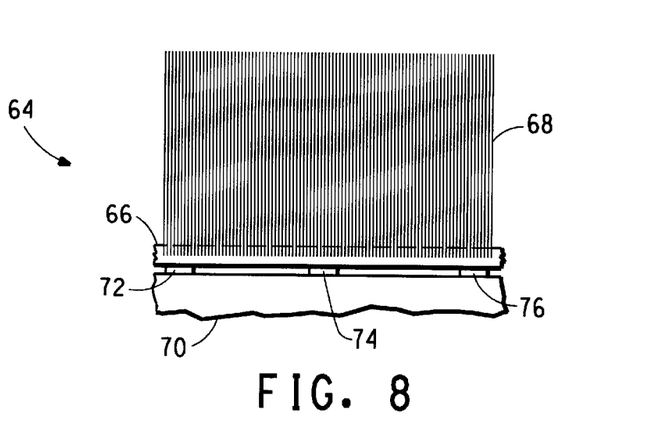
FIG. 8 is a side elevational view of a bristle sub-assembly connected at spaced intervals to the upper surface of a brush body.

The spot welds can be formed by any conventional means, including ultrasonic heating (assuming one or both of the bristles and base string are made of polymeric material), adhesive bonding, conventional heating (coupled with plastic deformation), and virtually any other suitable means. Also, if the base string 66 is connected continuously along the surface of the brush body, along a weld line, or glue line, if the connection is only at the tangent point between the base string 66 and the surface, the bristles will appear less stiff due to the torsional movement of the base string which is permitted by the fact that the base string is not completely bound throughout its circumference. Thus, controlling the circumferential degree of binding of the base string to the underlying brush structure will result in controlled stiffness.

For some applications, very fine filaments are preferred for their softness and their ability to penetrate small areas, such as, in the case of a toothbrush, small interdental and gingival areas. Their small cross-section, however, makes them weak and less durable when used in a toothbrush. Thus, another aspect of the present invention is to provide an elastomeric coating to a bristle sub-assembly which reinforces the filaments of the bristle sub-assembly from the bonded area up to a predetermined height. The height is selected to yield the desired stiffness of the tuft. This structure would resemble that of a used paint brush improperly cleaned, where the base portions of the bristles becomes thicker than the distal end portions, due to drying and hardening of paint on the base portions.

The coating of bristles permits fine filaments such as 2–5 mil filaments to be used entirely within a tuft and have the apparent stiffness of larger diameter filaments such as 6–10 mil. FIG. 6 illustrates such a coated bristle sub-assembly 52, in which the two rows of bristles 54 and 56, connected at their proximal ends to a base string 58, are provided with polymeric coatings 60 and 62 along the proximal end portions of the bristles. The length to which the coatings extend, as well as their thicknesses are material properties, such as hardness, will determine the amount of stiffness added to the fine bristles.

The coatings can be elastomeric resins or other suitable materials. They could further provide functionality with respect to a wear indication, bactericide or other desired properties difficult to incorporate into the monofilament bristle itself. The elastomeric resin coating can reduce the possibility of bristle shedding from the bristle sub-assembly, by adding additional adhesion between the base string and the bristles. It could also be used by the brush maker as a bonding agent in the process of making brushes, particularly where techniques that do not employ base strings are employed.

The non-bonded end of the bristle sub-assemblies would not be coated, nor attached to the adjacent filaments. Such a to structure would have similar performance to a tapered filament. This structure would also tend to resist splaying. The stiffness of a given filament would be determined by the relative viscosity of the resin used, the thickness to which it is applied, and the area (height) to which the bristle is treated. Coatings would have particular applicability to toothbrushes, which are limited to a minimum of 5 mil bristles. These small diameter brushes have relatively shortened periods of useful life, due to wear that leads to splaying. In conventional tufted brushes, it would difficult if not impossible to apply thin coatings to the bristles, due to the packing of bristles in a dense tuft hole, nor can select bristles be coated for the same reason. Using the bristle sub-assemblies described herein as well as in the co-pending applications, the brush maker can apply thin coatings onto pre-selected portions of the bristle/tuft.

To form the coatings on the bristles, the individual strands could be individually coated or stuck together for some given length, leaving the remaining length free, by solution coating, or by hot melt coating with a polymer having a lower melt point. The solution coating could be, as described in the Nylon Plastics Handbook by M. I. Kohan, pp286,287, Dupont's Elvamide® terpolymers such as a 6/66/610 or 6/66/69. Terpolymers are soluble in hot methanol or methanol/water solutions. These are typically used for thread bonding. The hot melt coatings could be Low melting nylon such as those made for hot melt coating. An example is Platamide H105, a 6/66/12 nylon terpolymer by Elf Atochem or Griltex® from EMS. Additional examples include Pebax® nylon elastomer by Elf Atochem to thermally bond to nylon filament, and Hytrel® polyester elastomer to thermally bond to polyester filament. Further examples include low melting materials grafted with reactive material such as maleic anhydride. An example is Kraton® FG1901X, a SEBS block copolymer modified with maleic anhydride. An example of glues that could be used herein are cyanoacrylate, sold commercially as "Super Glue."

Figure 9:
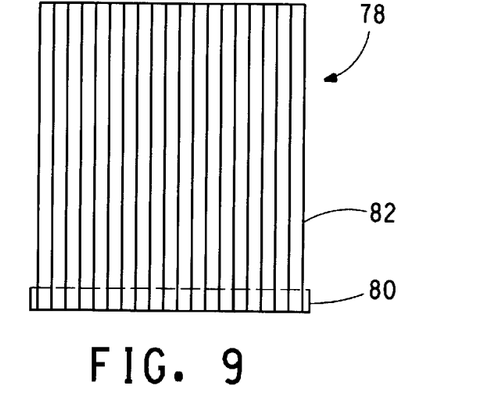
FIG. 9 is a side elevational view of a bristle sub-assembly, made according to the methods and apparatuses described in the aforementioned co-pending applications.
Figure 10:
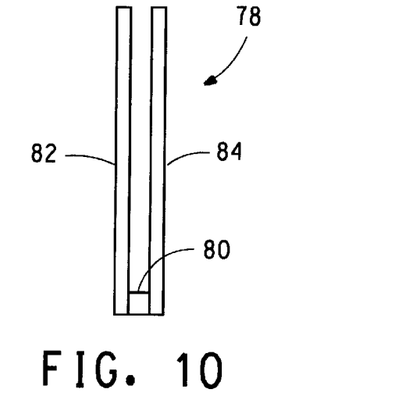
FIG. 10 is an end view of the bristle sub-assembly of FIG. 9.

FIGS. 9 and 10 illustrate a bristle sub-assembly 78 which, as in the previously described sub-assemblies, includes a base string 80 and two rows 82 and 84 of bristles. The scale shown in FIGS. 9 and 10 is exaggerated to highlight features at the proximal ends and distal ends of the bristles. Also, the base string is shown to be rectangularly shaped and disposed between the rows of bristles, although virtually any shape can be employed. Also, the base string can be any device that acts as a support beam for suspending the bristle sub-assembly across openings, or simply for supporting the beam at select positions to allow the beam to undergo torsional movement during brushing action of the bristles.

Figure 11:
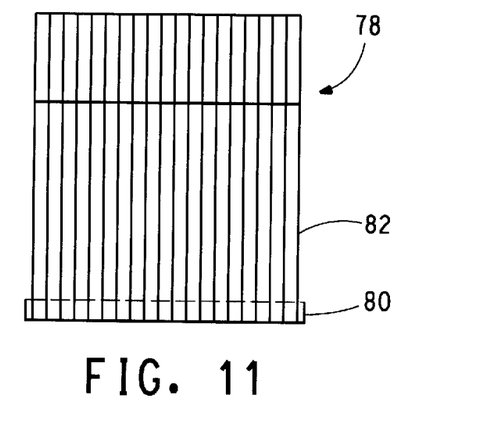
FIG. 11 is a side elevational view of the bristle sub-assembly of FIG. 9, after tapering the distal end portions of the bristles.
Figure 12:
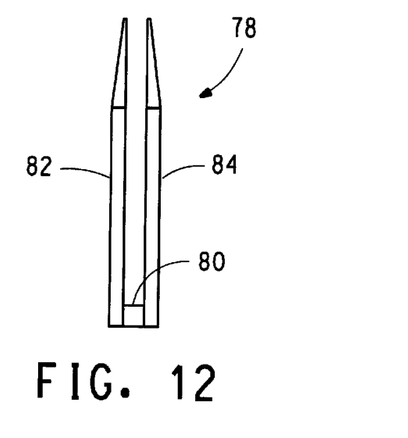
FIG. 12 is an end view of the bristle sub-assembly of FIG. 11.

As seen in FIGS. 9 and 10, the distal end portions of the bristles are sheared and have substantially the same thickness as the proximal ends that are connected to the base string 80. According to the present invention, the stiffness of the bristles can be changed by mechanically abrading the distal end portions to provide a taper, as shown in FIGS. 11 and 12. The abrading process provides a tapered portion 86 for the bristles that can go down the length of the bristles approximately 33% of the overall length.

Tapering changes the apparent stiffness of the bristles. For example, a 10 mil filament can be worked with an abrasive belt to undergo a reduction down to 10% of its original diameter, for example, to result in a 1 mil thickness at the tip. The taper can begin as far down the bristle as 33% of the overall length. Beyond that, the limits are efficiency, in that it may be more efficient to begin with a thinner bristle than to taper more than 33% of the overall length.

While an abrasive belt is one method of abrading and thus forming the taper on the bristle distal end portions, other means can be employed.

The present invention has been described above with reference to preferred embodiments. However, those skilled in the art will recognize that changes and modifications can be made in these preferred embodiments without departing from the scope of the present invention. Accordingly, these and other changes and modifications which are obvious to those skilled in the art are intended to be included within the scope of the present invention.

What is claimed is:

1. A method of manufacturing a brush comprising the steps of;

forming a bristle sub-assembly having a support beam and a plurality of bristles connected to the support beam;

forming a brush head;

connecting the support beam to the brush head at one point or at spaced intervals along the support beam; and varying at least one parameter of the support beam to thereby vary stiffness of the bristles.

2. A method according to claim 1, wherein the support beam is a base string made of a polymeric material.

3. A method according to claim 1, wherein the step of varying at least one parameter includes varying at least one parameter selected from the group consisting of the diameter of the base string, the material used to make the base string, the Young's Modulus of the support beam, the cross-sectional shape of the base string, and the length of the base string that is unconnected to the brush head.

4. A method according to claim 1, wherein the step of varying the at least one parameter includes varying at least one of the torsional stiffness of the support beam and the flexural stiffness of the support beam.

5. A bristle sub-assembly according to claim 1, wherein the support beam is selected from the group consisting of a glue line, a base string, and a bond area consisting of melted bristle material.

6. A method of manufacturing a brush comprising the steps of;

forming a bristle sub-assembly having a support beam and a plurality of bristles connected to the support beam;

forming a brush head;

connecting the support beam to the brush head at at least one point;

varying at least one parameter of the support beam to thereby vary stiffness of the bristles; and varying the stiffness of the bristles along the length of the bristle sub-assembly by varying the length of the support beam that is unconnected to the brush head.

7. A method of manufacturing a brush comprising the steps of;

forming a bristle sub-assembly having a support beam and a plurality of bristles connected to the support beam;

forming a brush head;

connecting the support beam to the brush head at at least one point, wherein the connecting step includes connecting opposite ends of the support beam to the brush head while leaving a length of the support beam between the opposite ends unconnected; and varying at least one parameter of the support beam to thereby vary stiffness of the bristles.

8. A brush comprising;

at least one bristle sub-assembly having a support beam and a plurality of bristles connected to the support beam;

a brush head; means for connecting the support beam to the brush head at spaced intervals along the support beam, thereby providing bristle stiffness which is dependent on the parameters of the support beam.

9. A brush according to claim 8, wherein the parameters include the diameter of the support beam, the material used to make the support beam, the Young's Modulus of the support beam, the cross-sectional shape of the support beam, and the length of the support beam that is unconnected to the brush head.

10. A brush according to claim 8, wherein the support beam is a polymeric base string.

11. A brush according to claim 8, wherein the support beam is selected from the group consisting of a glue line, a base string, and a bond area consisting of melted bristle material.

12. A brush comprising;

at least one bristle sub-assembly having a support beam and a plurality of bristles connected to the support beam;

a brush head; and means for connecting the support beam to the brush head at at least one point, thereby providing bristle stiffness which is dependent on the parameters of the support beam, wherein the connecting means includes means for connecting opposite ends of the support beam to the brush head while leaving a length of the support beam between the opposite ends unconnected, thereby providing bristle stiffness which is dependent on the parameters of the support beam.

* * * * *